…

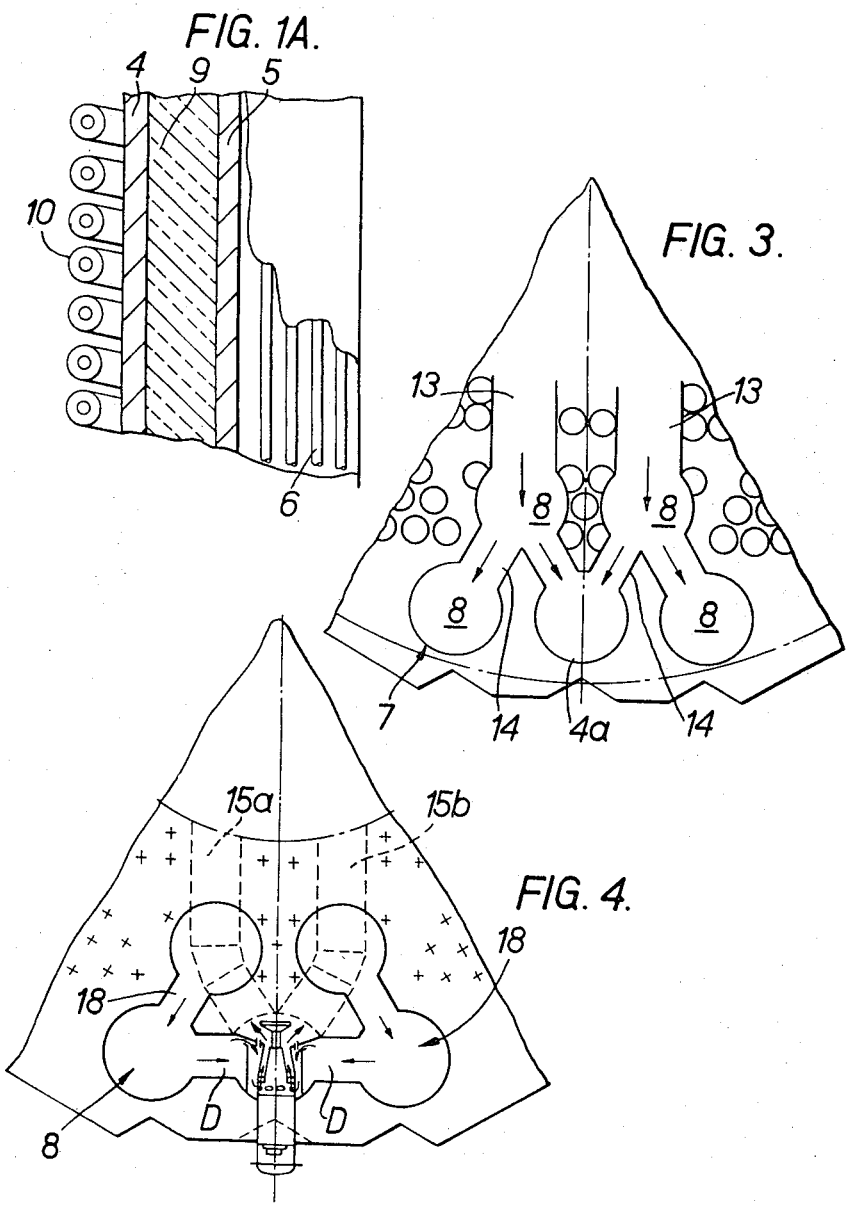

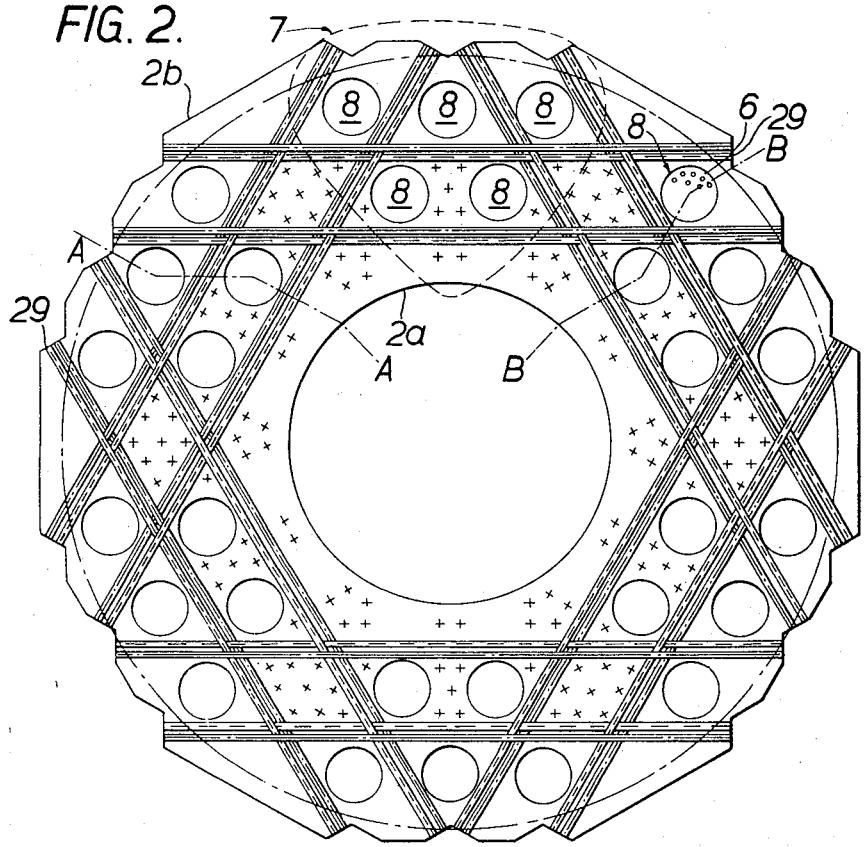

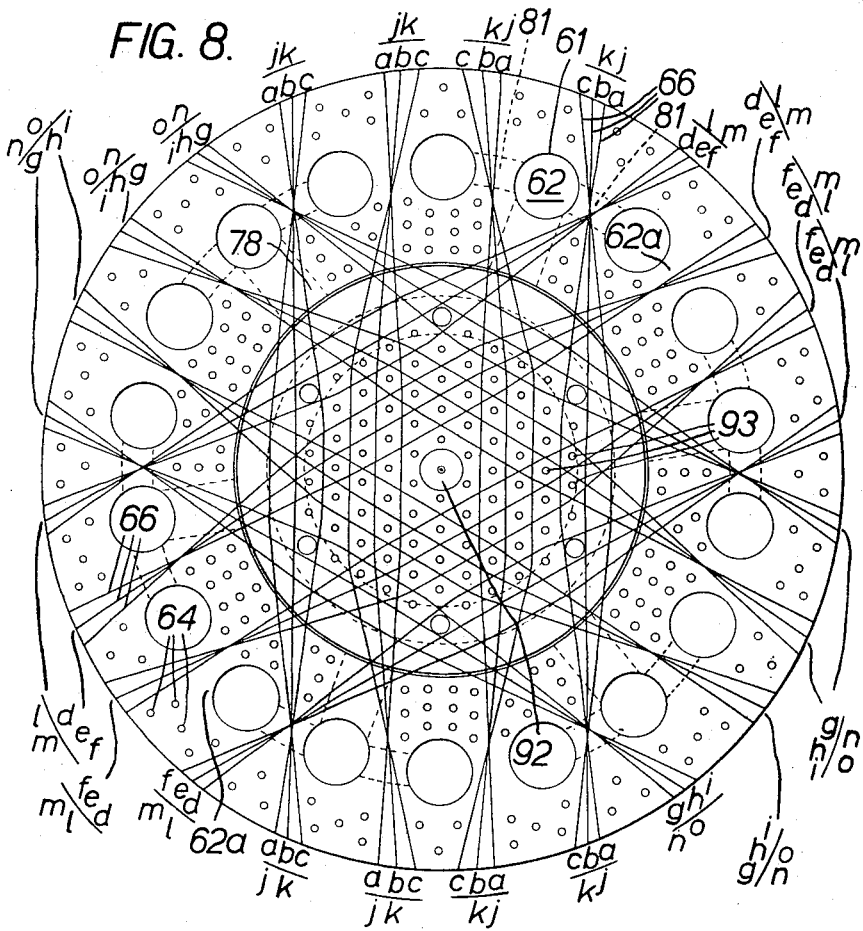

United States Patent Office 3,371,017
Patented Feb. 27, 1968

3,371,017
NUCLEAR REACTOR HAVING A PRESTRESSED CONCRETE PRESSURE VESSEL
Geoffrey Coast and George Edward Lockett, Dorchester, Dorset, and Robert Faulds McIver, Sandford, Wareham, England, assignors to United Kingdom Atomic Energy Authority, London, England
Filed Dec. 23, 1965, Ser. No. 515,997
Claims priority, application Great Britain, Jan. 12, 1965, 1,318/65; Sept. 29, 1965, 41,428/65
3 Claims. (Cl. 176—87)

ABSTRACT OF THE DISCLOSURE

A nuclear reactor has a prestressed concrete pressure vessel and has at least one reactor heat exchanger contained within the wall thickness of the prestressed concrete. In the case of multiple heat exchangers, they are disposed around the periphery of the vessel within the wall thickness of the prestressed concrete and separated circumferentially by ligaments of the concrete. The ligaments transmit compressive hoop stresses throughout the entire wall thickness, and the heat exchangers are staggered, with reinforcing members passing through the ligaments between staggered heat exchangers.

---

The present invention concerns a nuclear reactor using a prestressed concrete pressure vessel.

According to the present invention, a nuclear reactor has a prestressed concrete pressure vessel and has one or more reactor heat exchangers contained within the wall thickness of the prestressed concrete.

It will be understood that the word prestressed applies to all ways of improving the tensile strength of concrete by means of stressed reinforcements whether the stressing of the reinforcement is done during the setting of the concrete or afterwards.

An embodiment of the invention will now be described by way of example with reference to the accompanying drawings in which:

FIG. 1A is a scrap view of part of FIG. 1 to a larger scale,

Figure 1:
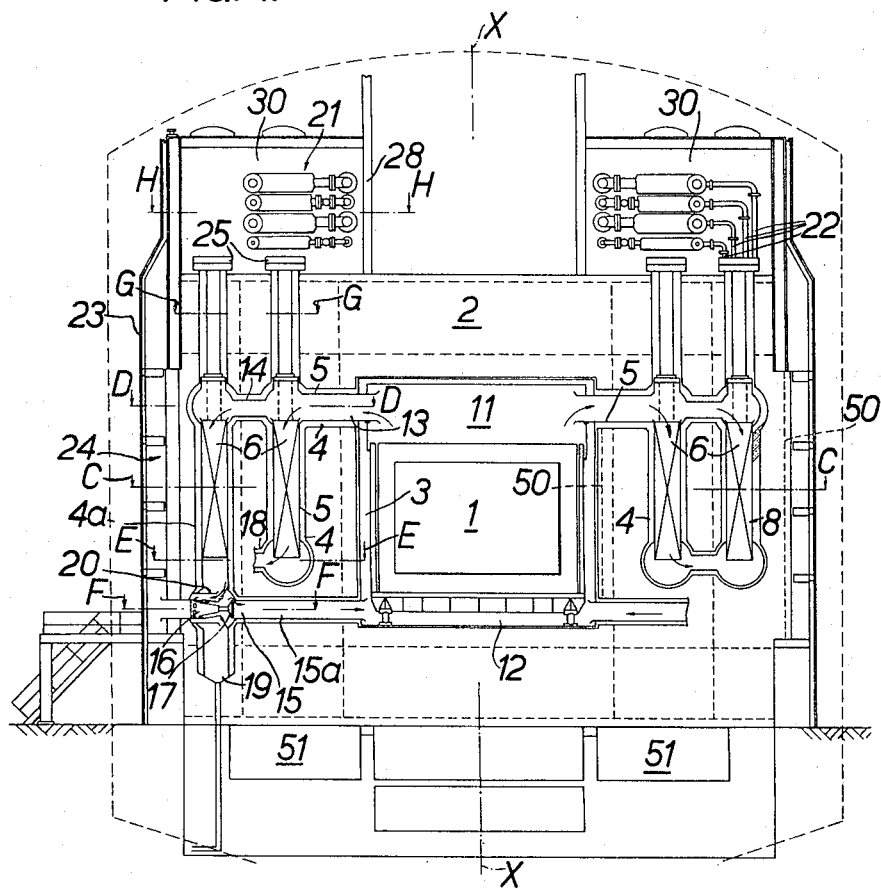
FIG. 1 is an elevational view part in cross-section through a wall of a prestressed concrete pressure vessel enclosing a nuclear reactor, the left hand half of the cross-section being taken along line A—A of FIG. 2, whilst the right hand half of the cross-section is taken along the line B—B of FIG. 2.
Figure 5:
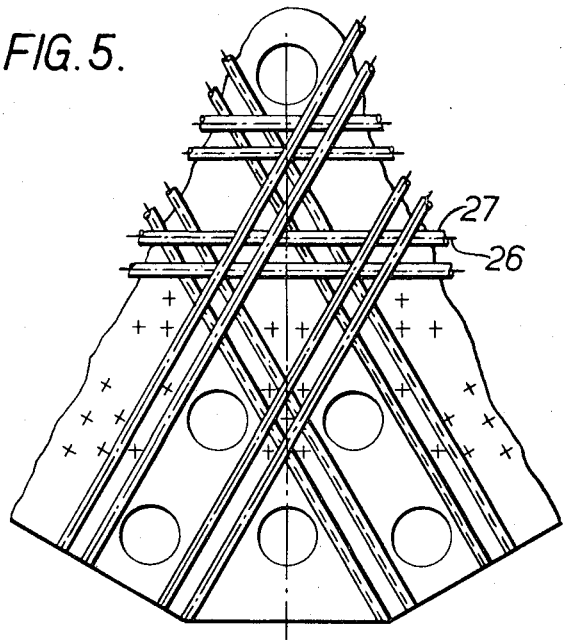
Figure 6:
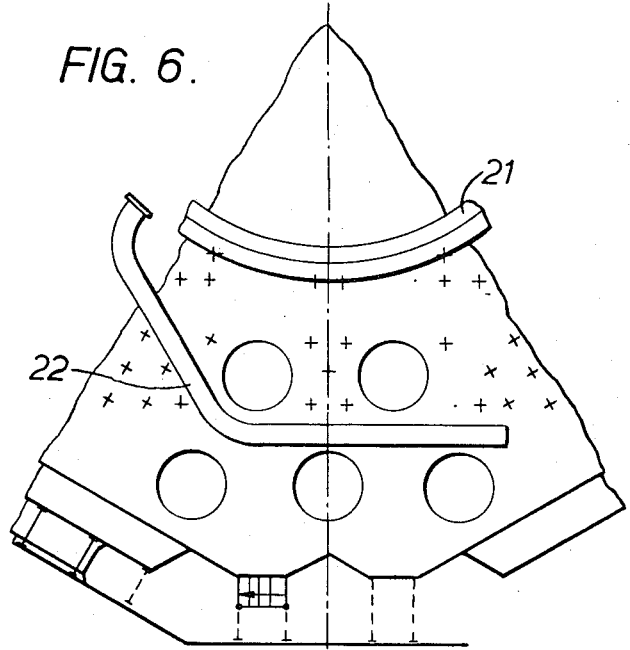
Figure 7:
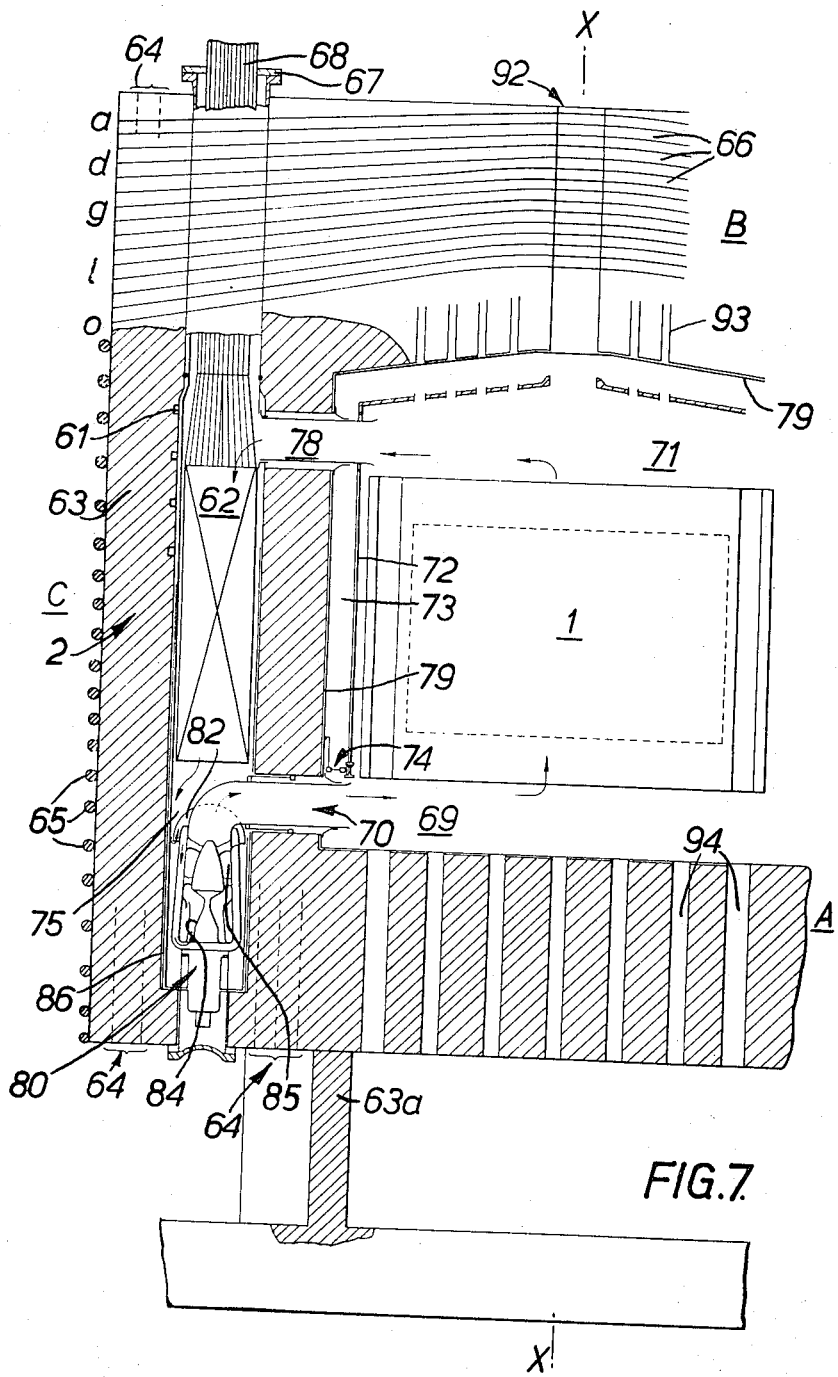

FIG. 2 is a part plan view showing a cross-section at the level of the line C—C of FIG. 1, FIG. 3 is a section along D—D of FIG. 1, FIG. 4 is a scrap section along line E—E of FIG. 1 with a part broken away to show the section along line F—F of FIG. 1, FIG. 5 is a scrap section along line G—G of FIG. 1, FIG. 6 is a scrap section along line H—H of FIG. 1, FIG. 7 is a fragmentary elevational section through a 500 megawatt (electrical) high temperature gas cooled nuclear reactor and its prestressed concrete pressure vessel and FIG. 8 is a diagrammatic plan view showing the paths of prestressing tendons embedded in the walls of the vessel which form the top and bottom slabs, the pattern being achievable by the invention.

In FIG. 1 a gas cooled nuclear reactor has a core 1 enclosed within a prestressed concrete pressure vessel 2 which includes a wall 3 of substantially cylindrical shape having an interior surface, or face, 2a subjected to reactor pressure and having an exterior surface, or face 2b, the line XX being its longitudinal axis. As is apparent from the drawings, the wall is of a one-piece integral construction between the surfaces 2a and 2b. Within the thickness of the cylindrical wall 3 are cast-in steel shutter tubes 4 some of which extend parallel with the vertical axis XX of the vessel and contain a series of heat exchange units 7 (see FIGURE 2) within the wall thickness. The concrete between the shutter tubes forms ligaments; and, as will be explained in greater detail below, these ligaments include sufficient concrete material between the tubes so that stresses arising from pressure within the vessel are resisted by the entire wall thickness from the said interior surface of the wall to the exterior surface thereof. The reactor coolant is circulated on a closed circuit through the reactor core and ducting 5 within tubes 4 to transfer heat to the secondary heat exchange medium e.g. water for steam raising, circulated through a number of tube banks 6 within the ducting 5.

The heat exchanger units 7 are six in number, each unit consisting of five individual parallel connected heat exchangers 8. The individual heat exchangers are of the multi-channel type with a primary or coolant circuit, and a secondary circuit consisting of a high pressure steam generating channel and one or more reheat channels. As shown in scrap view FIG. 1A, the hot gas ducting 5 is heat insulated from the shutter tube 4 by insulation 9, the shutter tubes themselves being water cooled by water passed through tube coils 10 welded to the outer walls of the tube.

The five exchangers in a unit are arranged (in W formation (FIG. 2)), two of the heat exchangers being nearer the inside face 2a of the wall and three nearer the outside face 2b of the wall (referred to herein as the inner and outer heat exchangers respectively).

Inside the pressure vessel the reactor core 1 has coolant channels (not shown) extending therethrough which communicate with top and bottom coolant plenums 11 and 12. The top plenum 11 communicates with the upper ends of each of the heat exchanger units by respective ducts (FIG. 3) whilst in each unit the upper ends of all five heat exchangers are interconnected by a W shaped manifold 14. The particular shutter tube 4a housing the central heat exchanger of the five is longer than the others and projects below the others as can be seen in FIG. 1.

The lower end of the primary circuit of this central heat exchanger is connected to the bottom plenum 12 by a duct 15 (FIG. 4) which divides into two branches 15a and 15b so disposed that each branch lies vertically below part of the W-shaped manifold 14. Inside the duct 15 is a coolant circulator 16 and a slightly imperfect closure valve 17 with an associated operating mechanism.

The bottom ends of the shutter tubes containing the five heat exchangers are interconnected by ducts 18 (FIGS. 1 and 4). The latter interconnect each of the inner heat exchangers and to a respective one of the two non-central outer heat exchangers which in turn are connected to a lower region of the duct 4a housing the central heat exchanger by ducts D.

Cast into the concrete and communicating with the bottom end of shutter tube containing the central heat exchanger is a sump 19 to receive any leakage of liquid from the steam channels. Baffles 20 are provided to deflect such leakage away from the coolant circulator and there are means (not shown) for blowing down the sump when the reactor is shut down.

The secondary or steam channels in the tube banks are brought through penetrations in the top of the pressure vessel and into an annular manifold 21 described below (FIG. 1) by riser ducts 22. Both the manifold 21 and ducts 22 are so disposed as to allow withdrawal of the heat exchanger tube banks vertically upwards and so removed from the shutter tubes after disconnection of the riser ducts 22.

Surrounding the pressure vessel 2 is a shroud 23 carried from and by the vessel. This shroud not only protects the vessel from the weather and keeps the outer surface of the vessel at a substantially constant temperature but also forms a space 24 surrounding the vessel which can be kept slightly below atmospheric pressure by a fan which discharges into a chimney (the fan and chimney are not shown). Flaws in or failure of, the vessel 2 lead only to slight leakage of radioactive products particularly if fission product retaining fuels are used in the reactor core and the shroud can be used to contain these products and to discharge them safely through the chimney at least until the chimney monitors operate and remedial action is taken.

The shutter tubes not only make good the loss of strength due to local absence of pre-stressing cables but also allow access to, and removal of, the various parts through normally closed ports 25, after dismantling of the heat exchange connections. One form of heat exchanger which may be made withdrawable in this matter has been described with reference to FIG. 2 in copending U. S. Patent application No. 441,726.

The arrangement of the heat exchangers and the associated ducts are described above and as shown in the drawings is such as to permit an adequate amount of vertical and horizontal steel reinforcement cables in the concrete and for the cables to follow straight runs between, and around, the heat exchangers since the various parts lie in each other's "shadow," that is, they lie one behind the other in the directions along the reinforcement runs. This steel reinforcement is in the form of steel cables 26 (FIG. 5) which are housed within tubes 27 and which are post-tensioned after the vessel has been cast. The horizontal wires are contained within tubes which follow vertically staggered paths which paths lie along chords of the roughly circular pressure vessel wall and referred to below as chordal reinforcement.

The pressure vessel is considered as being roughly cylindrical but, as shown, its inner wall, 2a is cylindrical and its outer wall 2b generally twelve sided. The vertical reinforcement wires are disposed as close to the vertical axis of the vessel as possible and extend from the top of the vessel to the bottom. The horizontal wires in the top cover of the pressure vessel, as shown in FIG. 5, pass very close indeed to the axis. Where the reinforcement penetrates the wall of the vessel, the outer surface 2b of the wall adjacent the penetration is rendered normal to the line of the reinforcement by forming shallow V shaped grooves 29 (FIG. 2). An annular wall 28 (FIG. 1) upstanding from the top of the pressure vessel forms with the outer wall 23, an annular chamber 30. Within the annular chamber 30 is the manifold assembly 21 which comprises a vertical stack of annular feeder pipes for directing feed water, the steam produced in the heat-exchanger and reheat steam into or from the secondary channels of the heat exchanger by way of the riser connections 22 disposed in the annular chamber. The riser connections to only one heat exchanger are shown in FIG. 1. FIG. 6 indicates the respective position of the riser connections 22 and the manifold assembly 21.

It will be appreciated that in the embodiment described, the advantages offered by siting the heat exchanger outside the reactor pressure vessel (mainly the ease of servicing), have been maintained, whilst the need for a stout secondary pressure containment has been obviated. The embodiment shows that a heat exchanger need not be inside or outside the pressure vessel, but can be contained within the wall thickness. Whilst it will normally be necessary to increase the wall thickness, it is possible, by careful design, to minimise this increase so that the vessel wall contains no more material than would that of a vessel large enought to contain both the heat exchanger and the core, and certainly less than the total material required for both a pressure vessel and a separate containment for an external heat exchanger.

Moreover it is possible to shut down a heat exchanger in the event of a tube burst by closing isolating valves in those pipes communicating with the defective heat exchanger. Simultaneously the appropriate valve 17 is activated to shut off duct 15 so preventing gross flooding of the reactor plenum 12. As the valve 17 does not form a perfect seal some of the cool gas in the pressure vessel may flow through duct 15 to cool those heat exchangers which are still reusable.

It may be desirable to provide water cooling in the outer region of the concrete vessel so that the temperature gradient through the vessel wall may be controlled, suggested positions for cooling tubes being indicated by dotted line 50 in FIG. 1. Tensioning of vehicle reinforcement may be effected if desired by bottom gallery 51.

In FIG. 7 a gas cooled nuclear reactor has a core 1 enclosed within a prestressed concrete pressure vessel 2 of substantially cylindrical shape, the line X—X being its longitudinal axis. Within the thickness of the cylindrical wall 2 are cast-in steel shutter tubes 61 some of which extend parallel with the vertical axis X—X of the vessel. The latter tubes house eighteen heat exchangers 62, similar to those described above, which are disposed inside shutter tubes 61 arranged on a single pitch circle of forty-eight feet diameter within the wall thickness of a concrete pressure vessel 63. The pressure vessel comprises a barrel portion C closed at the ends by bottom and top masses A and B respectively and is pre-stressed as will be described in greater detail later in this specification by vertical tendons 64 extending in the cylindrical wall and by circumferential tendons 65 around the barrel portion C and by tendons 66 extending along chordal paths in the bottom and top slabs A and B respectively forming the bottom and top of the pressure vessel. The compressive stresses set up by the prestressing tendons extend throughout the entire extent of the concrete, for example the stresses established by the tendons 65 are transmitted throughout the whole wall thickness of the barrel portion, via ligaments 62a which extend between the shutter tubes 61, to the inner surface of the barrel portion. Since the wall is prestressed throughout the whole wall thickness of the barrel portion, it follows, of course, that this entire wall thickness resists stresses arising from the pressure within the vessel.

The reactor core 1 and its support structure are spaced from the bottom of the chamber formed within the pressure vessel so as to leave a coolant inlet plenum 69 with which coolant inlet ducts 70 communicate. Above the core is a coolant outlet plenum 71. To protect the peripheral wall and the top of the chamber from the hot coolant at the outlet temperature, a shroud 72 defines a clearance space 73 for coolant between itself and the peripheral wall and top of the chamber. This shroud is supported on a series of struts (not shown) from the bottom of the chamber, these struts can rock slightly to allow for thermal expansion. The shroud 72 is of double walled construction and is arranged for the flow of a small quantity of coolant from the inlet plenum between the walls to cool it in operation. Baffles are provided between the shroud and the core and between the shroud 72 and the peripheral wall of the chamber. Of these baffles, which are designed to allow for thermal expansion, that indicated diagrammatically at 74 between the shroud and the peripheral wall is designed to permit a small flow of coolant through the space 73 so that this space is substantially at the coolant inlet temperature. The chamber is lined by a water cooled steel membrane 79 which ensures gas tightness and also a safe concrete operating temperature; the membrane 79 is thermally lagged to reduce the amount of water cooling required.

The heat exchangers 62 are removable upwardly from the shutter tubes 61 through access ports which are normally sealed by covers 67 through which the water and steam pipes 68 from the heat exchangers pass.

To economise on penetrations and auxiliary apparatus, the heat exchangers 62 are grouped in threes, connected in parallel by ducts 81, each group of three sharing a common coolant inlet duct 78, a common outlet duct 75 and a circulator 80. The circulators draw the coolant through the outlet ducts 75 from the heat exchangers and redirect it back into the coolant inlet ducts 70. Where the coolant enters the circulator it is drawn over a baffle 82 which screens the circulator intake from any liquid droplets which may become entrained in the coolant in the event of a heat exchanger leakage. Such droplets by virtue of their inertia are incapable of following sudden changes in direction.

Each circulator as in the previous embodiment consists of two separable parts, an electrically driven impeller 84 and a diffuser 85, and is mounted in a vertical penetration 86, the pressure vessel standing on a plinth 63a to allow access to the penetrations. The electrically driven impeller is removable down through this penetration to leave the diffuser behind.

Returning now to the pre-stressing, the tendon 65 consists of tensioned steel cables and extends for the entire length of the chamber and a short distance (say two feet) on each side. The top and bottom are prestressed by tendons 66, that is steel ropes, which extend through ducts along chordal paths in three general orientations which are angularly displaced relative to each other at 120° (FIG. 8). The tendons in general follow straight chordal paths evenly distributed across the core but they depart from the straight chordal paths to converge within the ligaments 62a between the heat exchanger shutter tubes 61, such departures are in any case desirable as will be appreciated by those skilled in the art. Where the tendons converge or where two tendons having different orientations cross, it is necessary for them to be vertically staggered. In the preferred embodiment illustrated, there are fifteen different levels *a* to *o* of tendons 66, the tendons within each level being parallel with each other and having like departures from the straight chordal paths. The tendons in the top three levels *a*, *b* and *c* have the same general orientation but differ as between layers by the extent of the departure from the straight chordal paths, the tendons *d*, *e* and *f* in the next three have a differing orientation and the tendons in the next lower three have the further general orientation. The remaining six bottom most levels *j* to *o* are a repeat of the above nine omitting that layer of each general orientation whose chordal path extends furthest from the axis of the reactor.

The vertical tendons 64, also within ducts, pass between the tendons 66. It will be appreciated that the only limitations on the positioning of the concrete prestressing reinforcement are penetrations provided in the pressure vessel. A central penetration 92 is provided in the top mass B in the present embodiment for a charge/discharge machine together with 84 smaller penetrations 93, on a 74 centimetre triangular pitch for control rod mechanisms. Six smaller penetrations 94 for introducing or discharging fuel assemblies are provided in the bottom mass A possibly additional fuel handling may be provided.

There is a British Patent No. 866,037 which describes and claims disposing heat exchangers in the annular space between two concentric concrete cylinders, the two cylinders being joined by radial ligaments and forming a single mass of concrete. This British Patent No. 866,037 in no way teaches the present invention for only the outer cylinder acts as a pressure vessel since the annular space 6 is pressurized and the ligaments 16 are too widely spaced at 120° intervals to transmit any appreciable strength between the cylinders.

In the present invention the heat exchangers are wholly surrounded by the stressed wall of the pressure vessel and the pressurisation of the heat exchangers is resisted by the shutter tubes and local stresses in the concrete.

We claim:
1. A nuclear reactor having a pressure vessel comprising a wall of prestressed concrete, the wall having an interior surface subjected to reactor pressure, and the wall also having an exterior surface and being of a one-piece integral construction between the said surfaces, a nuclear reactor core within the pressure vessel, a coolant circulator and a plurality of heat exchangers arranged in a coolant flow circuit which includes the core, a plurality of tubular shutter tubes, each cast into the said one-piece integral wall between the interior and exterior surfaces thereof, the tubes being wholly surrounded by and in contact with the said wall as inclusions in the said wall such that the said wall includes sufficient prestressed concrete material between the tubes so that stresses arising from pressure within the vessel are resisted by the entire wall thickness from the said interior surface of the wall to the said exterior surface of the wall, the said heat exchangers being contained within the said shutter tubes and being removable through the shutter tubes, and prestressing members prestressing the wall throughout its entire thickness from the said interior surface of the wall to the said exterior surface of the wall including the said concrete material between the tubes.

2. A nuclear reactor as claimed in claim 1 including at least eighteen heat exchangers each disposed in a shutter tube around the periphery within the wall thickness of the prestressed concrete, wherein the heat exchangers are separated circumferentially by ligaments which transmit compressive hoop stresses throughout the entire wall thickness of the reinforced concrete.

3. A nuclear reactor having a prestressed concrete pressure vessel, a nuclear reactor core within the vessel, a plurality of heat exchangers disposed around the periphery within the wall thickness of the prestressed concrete in which the heat exchangers are separated circumferentially by ligaments which transmit compressive hoop stresses throughout the entire wall thickness of the reinforced concrete, wherein the heat exchangers are grouped into units, the heat exchangers in a group being staggered and wherein reinforcing members pass through the ligaments between the staggered heat exchangers.

References Cited

UNITED STATES PATENTS 3,205,140  9/1965  Coudray et al. _____ 176—19

FOREIGN PATENTS 866,037  4/1961  Great Britain.
898,052  6/1962  Great Britain.
936,198  9/1963  Great Britain.

REUBEN EPSTEIN, *Primary Examiner.*